US011570847B2

(12) United States Patent
Huang et al.

(10) Patent No.: US 11,570,847 B2
(45) Date of Patent: *Jan. 31, 2023

(54) SYSTEMS AND METHODS FOR ESTABLISHING AND MODIFYING USER PLANE COMMUNICATIONS

(71) Applicant: Verizon Patent and Licensing Inc., Basking Ridge, NJ (US)

(72) Inventors: Ye Huang, San Ramon, CA (US); Miguel A. Carames, Long Valley, NJ (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/318,716

(22) Filed: May 12, 2021

(65) Prior Publication Data

US 2021/0267012 A1    Aug. 26, 2021

Related U.S. Application Data

(63) Continuation of application No. 16/799,547, filed on Feb. 24, 2020, now Pat. No. 11,039,502.

(51) Int. Cl.
*H04W 80/10* (2009.01)
*H04W 76/11* (2018.01)
(Continued)

(52) U.S. Cl.
CPC ....... *H04W 80/10* (2013.01); *H04W 28/0268* (2013.01); *H04W 60/00* (2013.01); *H04W 76/11* (2018.02); *H04W 76/12* (2018.02)

(58) Field of Classification Search
CPC ..... H04W 80/10; H04W 76/12; H04W 76/11; H04W 28/0268; H04W 60/00
(Continued)

(56) References Cited

U.S. PATENT DOCUMENTS 8,639,259 B2    1/2014 Ishii et al.
11,039,502 B1 *  6/2021 Huang .............. H04W 28/0268
(Continued)

OTHER PUBLICATIONS

"3rd Generation Partnership Project; Technical Specification Group Radio Access Network; NG-RAN; NG Application Protocol (NGAP) (Release 16)", 3GPP TS 38.413 V16.0.0 (Dec. 2019), Dec. 2019.
(Continued)

*Primary Examiner* — Nghi H Ly

(57) ABSTRACT

Systems described herein provide techniques for establishing and modifying user plane communications sessions between Long-Term Evolution ("LTE") User Equipment ("UE") devices, connected to LTE base stations, and a Fifth Generation ("5G") core network. An LTE-5G Interworking function ("LTE-5G IWF") may logically generate a virtual 5G UE and/or 5G base station, map a LTE UE to the virtual 5G UE, and cause the establishment of a Protocol Data Unit ("PDU") Session, at the 5G core network, with the virtual 5G UE. The LTE-5G IWF may provide PDU Session information to the LTE UE and base station to facilitate the establishment of user plane communications (e.g., via a tunnel) between the LTE UE and the 5G core network. The LTE-5G IWF may also receive modification parameters, such as Quality of Service ("QoS") parameters, and provide instructions to the 5G core and/or to the LTE UE to handle traffic according to such parameters.

20 Claims, 9 Drawing Sheets

(51) Int. Cl.
*H04W 76/12* (2018.01)
*H04W 60/00* (2009.01)
*H04W 28/02* (2009.01)

(58) Field of Classification Search
USPC ............. 370/329, 328, 338, 341, 345, 350
See application file for complete search history.

(56) References Cited

U.S. PATENT DOCUMENTS

| | | | |
|---|---|---|---|
| 11,395,331 B2* | 7/2022 | Li | H04W 68/02 |
| 2014/0153511 A1 | 6/2014 | Sirotkin | |
| 2018/0098334 A1* | 4/2018 | Tie | H04W 72/12 |
| 2019/0150225 A1 | 5/2019 | Mohamed et al. | |
| 2019/0182211 A1 | 6/2019 | Yang et al. | |
| 2019/0357104 A1* | 11/2019 | Onishi | H04W 28/0942 |

OTHER PUBLICATIONS

"3rd Generation Partnership Project; Technical Specification Group Services and System Aspects; Vocabulary for 3GPP Specifications (Release 16)", 3GPP TR 21.905 V16.0.0 (Jun. 2019), Jun. 2019.

"5G; Procedures for the 5G System (3GPP TS 23.502 version 15.2.0 Release 15)", ETSI TS 123 502 V15.2.0 (Jun. 2018), Jun. 2018.

"5G; System Architecture for the 5G System (3GPP TS 23.501 version 15.3.0 Release 15)", ETSI TS 123 501 V15.3.0 (Sep. 2018), Sep. 2018.

"gNB Interactions: 5G Standalone Access Registration", Feb. 2019 (available at https://www.eventhelix.com/5G/Standalone-access-registration/gNB.pdf), accessed Feb. 24, 2020).

"LTE Attach and Default Bearer Setup", Mar. 2019 (available at https://www.eventhelix.com/lte/attach/lte-attach.pdf, accessed Feb. 24, 2020).

"S1AP View of Inter MME S1 Handover in LTE", (available at https://www.eventhelix.com/lte/handover/s1/lte-inter-mme-s1-handover-s1ap-view.pdf, accessed Feb. 24, 2020).

"UE Interactions: 5G Standalone Access Registration", Feb. 2019 (available at https://www.eventhelix.com/5G/Standalone-access-registration/UE.pdf, accessed Feb. 24, 2020).

Sahu, "5G PDU Session Establishment", Oct. 2018 (available at http://5gblogs.com/5g-pdu-session-establishment/, accessed Feb. 24, 2020).

* cited by examiner

SYSTEMS AND METHODS FOR ESTABLISHING AND MODIFYING USER PLANE COMMUNICATIONS

CROSS-REFERENCE TO RELATED APPLICATION

This Application is a Continuation of U.S. patent application Ser. No. 16/799,547, filed on Feb. 24, 2020, titled "SYSTEMS AND METHODS FOR ESTABLISHING AND MODIFYING USER PLANE COMMUNICATIONS," the contents of which are herein incorporated by reference in their entirety.

BACKGROUND

Wireless networks utilize different types of radio access networks ("RANs") and/or core networks. Fifth Generation ("5G") RANs may offer relatively low latency and/or high throughput services, but may not be as widely deployed as Long-Term Evolution ("LTE") RANs, which may be available or already installed in areas that do not have 5G coverage.

DETAILED DESCRIPTION OF THE PREFERRED EMBODIMENTS

The following detailed description refers to the accompanying drawings. The same reference numbers in different drawings may identify the same or similar elements.

Embodiments described herein provide for the establishment and modification of connections (e.g., user plane sessions) between User Equipment ("UE") communicating via a LTE radio access technology ("RAT") and a 5G core network. As discussed herein, a LTE-to-5G Interworking Function ("LTE-5G IWF") may be communicatively coupled to one or more devices or systems associated with an LTE network (e.g., one or more LTE base stations, which may take the form of evolved Node Bs ("eNBs") and/or one or more Mobility Management Entities ("MMEs")) and to one or more devices or systems associated with a 5G network (e.g., an Access and Mobility Function ("AMF")).

As described herein, the LTE-5G IWF may receive information regarding a LTE UE that has connected to a particular eNB (e.g., using an LTE RAT), and may simulate control plane signaling associated with establishing communications between the UE and an LTE core network. Further, the LTE-5G IWF may simulate, based on the eNB and the LTE UE, a 5G base station (e.g., a Next Generation Node B ("gNB")) and a 5G UE. As discussed herein, the simulated gNB and 5G UE may be referred to as a "virtual" gNB and a "virtual" 5G UE, or as a "vgNB" and a "vUE," respectively. The LTE-5G IWF may communicate control signaling with an AMF of a 5G core network to simulate the establishment of communications between the 5G core network and the vUE (e.g., as if the vUE were connected to the vgNB). By virtue of performing these control signaling processes with elements of the LTE network and the 5G network, each of these networks may maintain a context associated with a UE. That is, the LTE network may maintain context information associated with the LTE UE, and the 5G network may maintain context information associated with the vUE. As described herein, these "dual" contexts (i.e., as maintained by the LTE and 5G networks, respectively) may further be used to establish and/or modify one or more user plane data sessions between the LTE UE and a User Plane Function ("UPF") of the 5G network.

Figure 1:
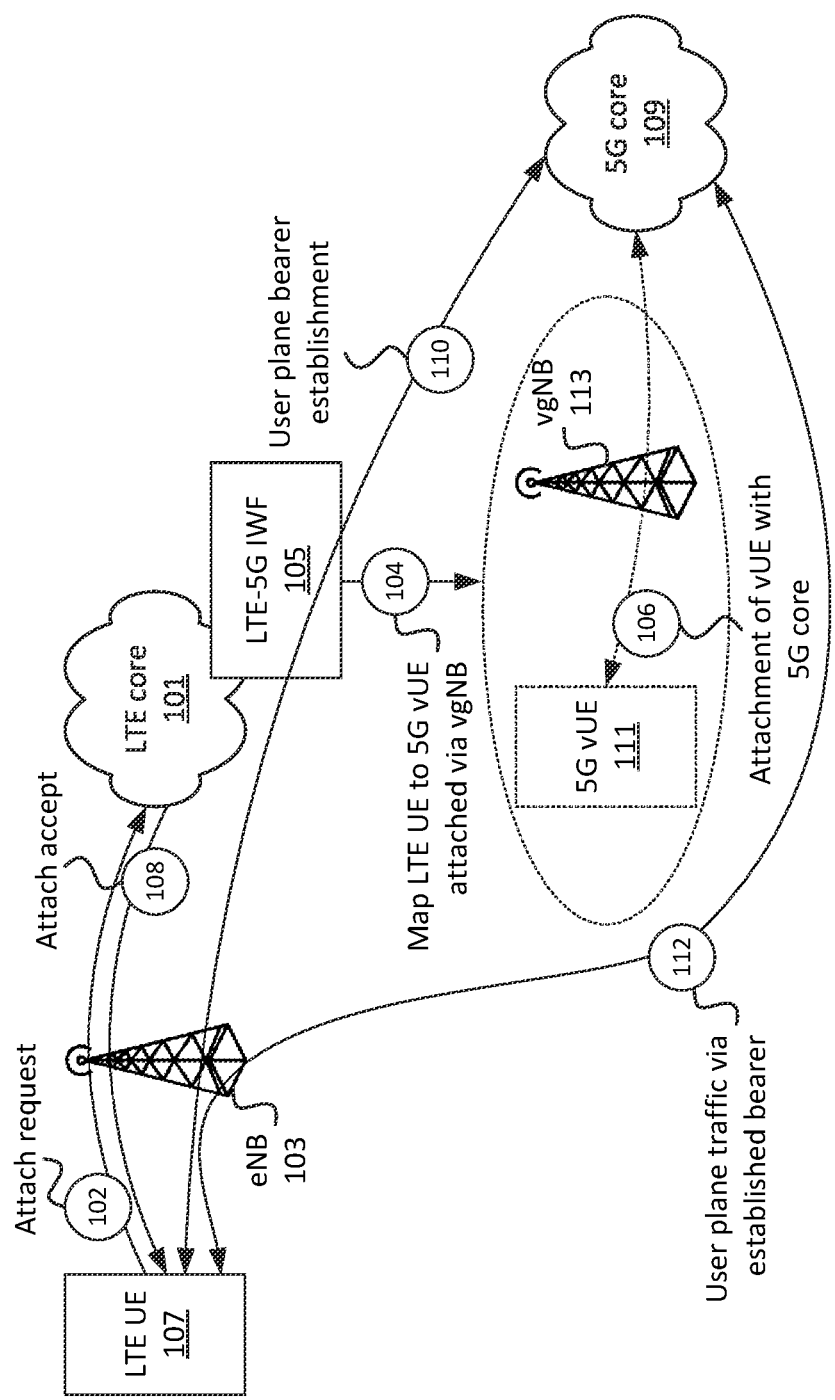
FIG. 1 illustrates an example overview of one or more embodiments described herein, in which a Long-Term Evolution ("LTE")-to-Fifth Generation ("5G") Interworking Function ("LTE-5G IWF") may operate to establish communications between a LTE User Equipment ("UE") and a 5G core network.

FIG. 1 provides an overview of some of the concepts discussed above. As shown in FIG. 1, for example, LTE core network 101 may receive (at 102) an Attach Request. For the sake of simplicity, the Attach Request is shown in this figure as originating from LTE UE 107. In practice, the Attach Request may be received from eNB 103, which may output the Attach Request based on a Radio Resource Configuration ("RRC") connection procedure performed between UE 101 and eNB 103. That is, once a radio frequency ("RF") connection has been established between UE 101 and eNB 103, eNB 103 may output the Attach Request, associated with UE 101, to one or more elements of LTE core 101. The Attach Request may be sent via an S1-C interface between eNB 103 and an MME of LTE core 101.

As shown in FIG. 1, LTE core 101 may include, and/or may be communicatively coupled to, LTE-5G IWF 105. For example, LTE-5G IWF 105 may be communicatively coupled with an MME of LTE core 101 (e.g., a particular MME that received the Attach Request from eNB 103), and may receive the Attach Request from the MME. Additionally, or alternatively, a first MME of LTE core 101 may receive the Attach Request, determine that LTE UE 107 and/or the Attach Request should be forwarded to a second MME and/or to LTE-5G IWF 105, and may accordingly forward the Attach Request to the second MME and/or to LTE-5G IWF 105.

The Attach Request may include information identifying LTE UE 107. Generally, the identifying information received in the Attach Request may include identifying information used by LTE networks to establish communications between LTE UEs and LTE RANs and/or a LTE core network. The identifying information received in the Attach Request may include, in some embodiments, International Mobile Subscriber Identity ("IMSI"), International Mobile Station Equipment Identity ("IMEI"), Globally Unique Temporary Identifier ("GUTI"), and/or identifying information of LTE UE 107. In some embodiments, the Attach Request may include one or more Packet Data Network ("PDN") identifiers, which may indicate a type of service or application that LTE UE 107 is requesting (e.g., voice, data, etc.).

Once LTE-5G IWF 105 receives the Attach Request, LTE-5G IWF 105 may generate a 5G context, for subsequent use by 5G core network 109, associated with LTE UE 107. For example, LTE-5G IWF 105 may map a first set of identifiers associated with LTE UE 107 (e.g., IMSI, IMEI, GUTI, PDN identifier, and/or one or more other identifiers) to a second set of identifiers. As discussed above, this first set of identifiers may have been received via the Attach Request, and may be associated with operations related to LTE networks. The second set of identifiers may be generated by LTE-5G IWF 105 and/or selected from a pool of available identifiers, and may be associated with operations related to 5G networks. The second set of identifiers may include, for example, a Subscription Concealed Identifier ("SUCI"), a Subscription Permanent Identifier ("SUPI"), a Permanent Equipment Identifier ("PEI"), Access Point Name ("APN"), and/or another identifier. In some embodiments, the second set of identifiers may include one or more cell or base stations identifiers associated with 5G networks, such as a New Radio ("NR") Cell Identity ("NCI"), NR Cell Global Identity ("NCGI"), and/or some other identifier associated with base stations (e.g., gNBs) associated with a 5G RAN.

In some embodiments, the second set of identifiers may be generated based on the first set of identifiers. For example, LTE-5G IWF 105 may generate one or more of the second set of identifiers by performing a hash or some other function based on one or more of the first set of identifiers. In some embodiments, the second set of identifiers may be generated or selected independent of the values of the first set of identifiers.

As mentioned above, the mapped identifiers (e.g., the second set of identifiers) may be associated with a "virtual" UE and gNB, conceptually shown in FIG. 1 as 5G vUE 111 and vgNB 113, and may be used to simulate the attachment of vUE 111 to 5G core network 109 via vgNB 113. LTE-5G IWF 105 may thus maintain a "dual context" associated with LTE UE 107. A first context may include information (such as the first set of identifiers) used to establish, maintain, modify, etc. communications between LTE UE 107 and LTE core network 101, and the second context may include information (such as the second set of identifiers) used to establish, maintain, modify, etc. communications between 5G vUE 111 and 5G core network 109. As described herein, these dual contexts may be used by LTE-5G IWF 105 to facilitate communications between LTE UE 107 and 5G core network 109.

For example, as described in greater detail below, LTE-5G IWF 105 may use one of these contexts (e.g., including the second set of identifiers) to simulate (at 106) the attachment of vUE 111 to 5G core network 109. The attachment procedure may be performed, for example, by way of communications between LTE-5G IWF 105 and an AMF of LTE-5G IWF 105. Thus, while conceptualized in the figure as being "performed by" 5G vUE 111 through vgNB 113, the actual signaling to simulate the attachment of 5G vUE 111 to 5G core network 109 may be performed by LTE-5G IWF 105.

Figure 2A:
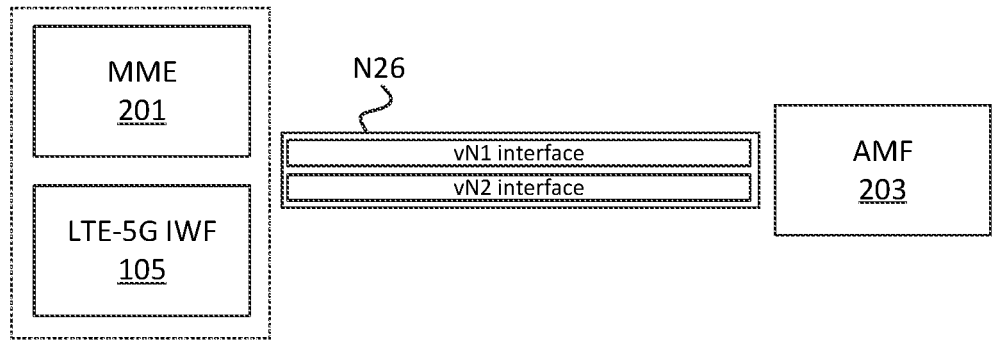
FIGS. 2A and 2B conceptually illustrate virtual 5G interfaces, which may be provided by the LTE-5G IWF of some embodiments.

For instance, as shown in FIG. 2A, LTE-5G IWF 105 and/or MME 201 (which may be associated with LTE core network 101) may communicate with AMF 203 (which may be associated with 5G core network 109) via an N26 interface. In some embodiments, LTE-5G IWF 105 may communicate with AMF 203 "directly" via the N26 interface. In some embodiments, LTE-5G IWF 105 may "indirectly" communicate with AMF 203 via the N26 interface by communicating with MME 201, which may in turn communicate with AMF 203 via the N26 interface. Similarly, AMF 203 may communicate with LTE-5G IWF 105 "directly" via the N26 interface, and/or "indirectly" by communicating messages, intended for LTE-5G IWF 105, to MME 201. For brevity, communications will be described herein as though LTE-5G IWF 105 and AMF 203 are "directly" connected via the N26 interface. In practice, such communications may be provided "indirectly" in a manner similar to that outlined above.

Via the interface between LTE-5G IWF 105 and AMF 203, "virtual" N1 and N2 interfaces (shown in the figure as "vN1" and "vN2") may be provided. For example, LTE-5G IWF 105 and AMF 203 may communicate, via N26 messages (e.g., in N26 "containers"), N1 and/or N2 messages (e.g., messages in N1 and/or N2 containers). That is, a "vN1" message may be passed by LTE-5G IWF 105 to AMF 203 (or vice versa) by providing the message in an N1 container that is contained within an N26 container. Similarly, a "vN2" message may be passed by LTE-5G IWF 105 to AMF 203 (or vice versa) by providing the message in an N2 container that is contained within an N26 container.

Figure 2B:
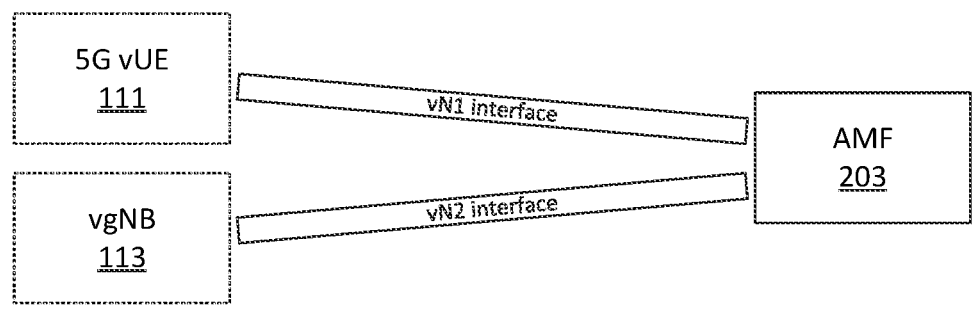

As shown in FIG. 2B, for example, the vN1 interface may be used to simulate messages between vUE 111 and AMF 203, and the vN2 interface may be used to simulate messages between vgNB 113 and AMF 203. Thus, a message sent by LTE-5G IWF 105 via the vN1 interface (e.g., in an N1 container) may be interpreted by AMF 203 as having been sent by vUE 111, while a message sent by LTE-5G IWF 105 via the vN2 interface (e.g., in an N2 container) may be interpreted by AMF 203 as having been sent by gNB 113.

Returning to FIG. 1, once the attachment of 5G vUE 111 to 5G core network 109 has been simulated, LTE-5G IWF 105 may perform (at 110) a user plane bearer establishment procedure. A more detailed example of this procedure is provided below. Briefly, this procedure may include establishing one or more bearers, sessions, tunnels (e.g., a General Packet Radio Service ("GPRS") Tunneling Protocol ("GTP") tunnel), etc. between eNB 103 and one or more devices or systems (e.g., a UPF) associated with 5G core network 109. Once established, eNB 103 and 5G core network 109 (e.g., a UPF of 5G core network 109) may be configured to communicate (at 112) user plane traffic, such as voice traffic, data traffic, etc., with each other. Further, by virtue of its attachment to eNB 103, LTE UE 107 may now be considered to be communicatively coupled to 5G core network 109, and may communicate with 5G core network 109 without using any different signaling than when LTE UE 107 is communicatively coupled to LTE core network 101.

Figure 3:
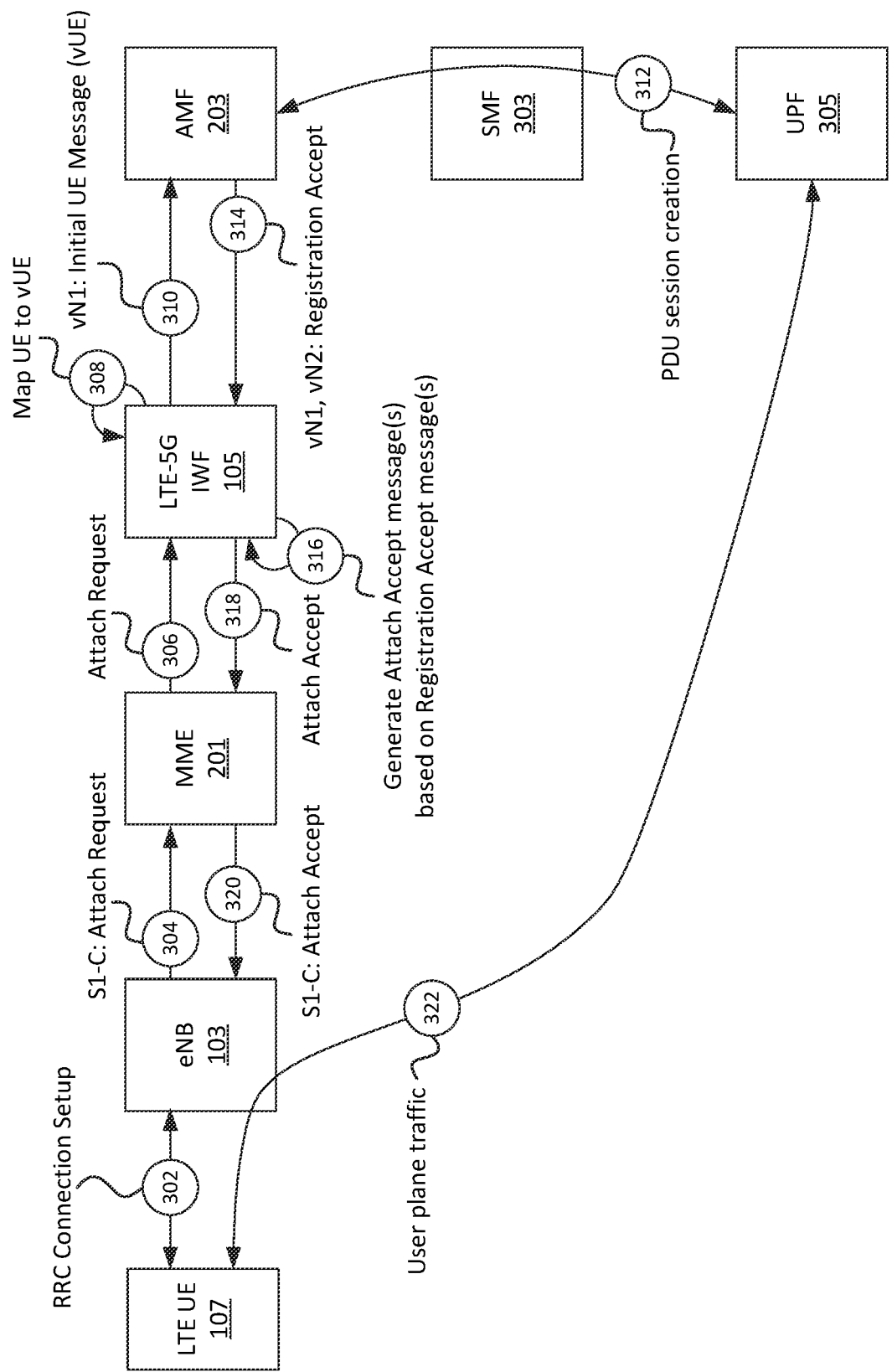
FIG. 3 illustrates example signaling, involving a LTE-5G IWF, to establish communications between a LTE UE and a 5G core network, in accordance with some embodiments.

As referred to above, FIG. 3 illustrates example signaling, involving LTE-5G IWF 105, to establish communications between LTE UE 107 and a 5G core network 109, in accordance with some embodiments. As shown, LTE UE 107 and eNB 103 may perform (at 302) an RRC Connection Setup procedure. By way of this procedure, LTE UE 107 and eNB 103 may establish an RF connection, via which LTE UE 107 and eNB 103 may communicate wirelessly. As part of this procedure, eNB 103 may receive or determine one or more identifiers associated with LTE UE 107, such as IMSI, IMEI, GUTI, and/or some other suitable identifier of LTE UE 107. Further, as part of this procedure, eNB 103 may also identify one or more types of services or networks to which UE 107 is authorized to access, which may be indicated by one or more APNs. For example, one or more messages sent from UE 107 to eNB 103 as part of this procedure may indicate the one or more APNs. In some embodiments, different APNs may be associated with different services (e.g., one APN may be associated with voice call services, another APN may be associated with data services, etc.).

Once the RF connection between LTE UE 107 and eNB 103 has been established, eNB 103 may output (at 304) an Attach Request to MME 201. The Attach Request may be provided via an S1 interface (e.g., an S1-C interface) between eNB 103 and MME 201. The Attach Request may include one or more of the identifiers associated with LTE UE 107.

MME 201 may, in some embodiments, be an MME that is associated with a tracking area ("TA") with which LTE UE 107 and/or eNB 103 is associated. In some embodiments, MME 201 may be communicatively coupled with LTE-5G IWF 105. MME 201 may output (at 306) an Attach Request to LTE-5G IWF 105. In some embodiments, this Attach Request (output at 306) may include the Attach Request provided by eNB 103, and/or may otherwise be based on the Attach Request provided by eNB 103. For example, the Attach Request (output at 306) may include identifying information for LTE UE 107.

In some embodiments, MME 201 may pass through (at 306) the Attach Request (received at 304) without modifying the Attach Request. In some embodiments, an interface (e.g., an S1-C interface) may be provided directly between eNB 103 and LTE-5G IWF 105, and eNB 103 may output the Attach Request to LTE-5G IWF 105 directly (e.g., without outputting the Attach Request to MME 201) via the provided interface.

LTE-5G IWF 105 may map (at 308) LTE UE 107 to a virtual UE (e.g., 5G vUE 111). For example, as similarly discussed above, LTE-5G IWF 105 may generate a set of identifiers associated with 5G vUE 111, and maintain information indicating that this set of identifiers is associated with LTE UE 107. This set of identifiers may include, for example, SUCI, SUPI, PEI, and/or some other identifier that may be used by AMF 203 and/or other elements of 5G core network 109 to identify or communicate with 5G vUE 111. In some embodiments, LTE-5G IWF 105 may generate these identifiers by performing a hash or some other function on one or more identifiers of LTE UE 107 (e.g., IMSI, IMEI, etc.). In some embodiments, LTE-5G IWF 105 may generate these identifiers in a manner independent of the identifiers of LTE UE 107 (e.g., using random and/or arbitrary identifiers). In some embodiments, LTE-5G IWF 105 may select these identifiers from a pool of available identifiers, and remove any identifiers from this pool when selecting them for 5G vUE 111 (e.g., mapping the selected identifiers to LTE UE 107).

In some embodiments, LTE-5G IWF 105 may also associate 5G vUE 111 with vgNB 113. That is, from the standpoint of 5G core network 109, 5G vUE 111 may be a wireless 5G UE that is wirelessly connected to vgNB 113. In actuality, and from the standpoint of LTE-5G IWF 105, 5G vUE 111 and vgNB 113 may be virtual devices with a logical association. LTE-5G IWF 105 may store or maintain this mapping for subsequent communications described herein.

LTE-5G IWF 105 may proceed to establish logical communications between AMF 203 and 5G vUE 111. For example, LTE-5G IWF 105 may output (at 310), via an N1 interface (e.g., a vN1 interface) between LTE-5G IWF 105 and AMF 203, an Initial UE Message. The Initial UE Message may include one or more of the identifiers for 5G vUE 111 generated or selected by LTE-5G IWF 105 (e.g., SUPI, SUCI, PEI, etc.). In some embodiments, the Initial UE Message may include one or more Protocol Data Unit ("PDU") Session IDs, which may be used to establish a PDU Session between 5G vUE 111 and UPF 305, and/or AMF 203 may determine or generate one or more PDU Session IDs based on the Initial UE Message.

As described above, the N1 interface may be provided via a "virtual" N1 interface (e.g., "vN1") between LTE-5G IWF 105 and AMF 203. For example, LTE-5G IWF 105 may send the Initial UE Message to AMF 203 in an N1 container, via an N26 interface between LTE-5G IWF 105 and AMF 203. In some embodiments, although not explicitly shown here, LTE-5G IWF 105 may instruct MME 201 to send the Initial UE Message to AMF 203 via an N26 interface between MME 201 and AMF 203. For example, LTE-5G IWF 105 may provide the Initial UE Message to MME 201 in an N1 container, along with an instruction to provide the N1 container to AMF 203 via the N26 interface. Upon receiving the Initial UE Message, AMF 203 may perform (at 312) a PDU Session creation process, which may include communicating with one or more other elements of 5G core network 109, such as Session Management Function ("SMF") 303 and/or UPF 305.

The PDU Session creation process may include the generation or selection of a Core Network ("CN") Tunnel identifier ("CN Tunnel ID"), as well as the generation or selection of an IP address for 5G vUE 111. As described herein, this IP address may ultimately be used by UPF 305 and LTE UE 107 to establish user plane communications between UPF 305 and LTE UE 107. As part of the PDU Session creation process (at 310), the IP address may be generated or selected by SMF 303 and/or by UPF 305. The IP address may include an IPv4 address, an IPv6 address, and/or a portion of an IPv6 address (e.g., an IPv6 prefix). As part of this PDU Session creation process, the generated CN Tunnel ID and IP address may be provided to AMF 203 (e.g., by SMF 303 via an N11 interface, and/or by UPF 305 via an N4 interface).

Once the PDU Session creation process is complete, AMF 203 may output (at 314) one or more Registration Accept messages to LTE-5G IWF 105. The Registration Accept messages may be provided in an N1 container and an N2 container (e.g., via the "virtual" N1 and N2, or "vN1" and "vN2," interfaces between AMF 203 and LTE-5G IWF 105). The Registration Accept messages may include information received by AMF 203 as part of the PDU Session creation process (at 310). Generally, the message sent via the vN1 interface may serve to logically associate 5G vUE 111 with the PDU Session, and the message sent via the vN2 interface may serve to logically associate vgNB 113 with the PDU Session.

For example, the Registration Accept message (sent at 314 via the vN1 interface, also referred to as the "vN1 Registration Accept message") may include the CN Tunnel ID and the IP address associated with 5G vUE 111. In some embodiments, the vN1 Registration Accept message may include other information, such as Quality of Service ("QoS") information associated with the PDU Session, Data Network Name ("DNN") determined based on PDN identifier included in the Attach Request, and/or other parameters associated with PDU Session establishment.

In some embodiments, the Registration Accept message (sent at 314 via the vN2 interface, also referred to as the "vN2 Registration Accept message") may include the CN Tunnel ID. In some embodiments, the vN2 Registration Accept message may include a slice identifier of a 5G network slice associated with AMF 203, SMF 303, and/or UPF 305 (e.g., Single-Network Slice Selection Assistance Information ("S-NSSAI")). In some embodiments, the vN2 Registration Accept message may include QoS-related information, such as QoS Flow Identifier ("QFI") and/or one or more QoS profiles associated with the PDU Session.

Thus, from the standpoint of 5G core network 109, a PDU Session has been established between UPF 305 and 5G vUE 111, via vgNB 113. That is, UPF 305 may maintain information indicating that the PDU Session, having the PDU Session ID, is associated with the IP address associated with 5G vUE 111. As discussed herein, this IP address and PDU Session ID may subsequently be used (e.g., by LTE-5G IWF 105) to establish communications between UPF 305 and LTE UE 107.

Once LTE-5G IWF 105 receives the vN1 and vN2 Registration Accept messages, LTE-5G IWF 105 may generate (at 316) an Attach Accept message based on the information included in the vN1 and vN2 Registration Accept messages. The generated Attach Accept message may be in a format utilized by elements of LTE core network 101 (e.g., MME 201) and/or an LTE RAN (e.g., eNB 103). In order to generate the Attach Accept message, LTE-5G IWF 105 may map one or more of the parameters indicated in the vN1 and/or vN2 Registration Accept messages to one or more parameters that may be utilized by MME 201, eNB 103, and/or LTE UE 107 to establish the PDU Session. In some embodiments, LTE-5G IWF 105 may store information indicating 5G parameters (e.g., as received in the vN1 and vN2 Registration Accept messages) to LTE parameters (e.g., to include in the Attach Accept message).

For example, LTE-5G IWF 105 may map the QoS information indicated in the vN1 and/or vN2 Registration Accept messages (e.g., QFI, QoS profiles, S-NSSAI, etc.) to QoS information utilized by MME 201, eNB 103, and/or LTE UE 107, such as QoS Class Identifier ("QCI"), Traffic Flow Template ("TFT"), and/or other QoS-related parameters. In some embodiments, the Attach Accept message may include some of the information included in the vN1 and/or vN2 Registration Accept messages, such as the CN Tunnel ID. In some embodiments, this information may be placed in a different field in the Attach Accept message and/or may be denoted as a different information element ("IE"). For example, the CN Tunnel ID may be represented in the Attach Accept message as a Tunnel Endpoint Identifier ("TEID"), and/or the PDU Session ID may be represented in the Attach Accept Message as an Evolved Packet System ("EPS") Bearer ID. The Attach Accept message may include the IP address generated or selected as part of the PDU Session creation process (at 312). As discussed below, this IP address may be assigned to LTE UE 107, to facilitate communications between LTE UE 107 and UPF 305.

LTE-5G IWF 105 may provide (at 318) the Attach Accept message to MME 201, which may output (at 320) the Attach Accept message to eNB 103. For example, MME 201 may output the Attach Accept message to eNB 103 via the S1 interface (e.g., via the S1-C interface). In some embodiments, as similarly described above, LTE-5G IWF 105 may provide the Attach Accept message "directly" to eNB 103 (e.g., via an S1-C interface), without providing the Attach Accept message to MME 201. Based on the information received in the Attach Accept message (at 320), eNB 103 may establish communications (e.g., an EPS bearer such as a "default" bearer, a PDU Session, etc.) with UPF 305. In some embodiments, the communications between eNB 103 and UPF 305 may be, may include, and/or may be carried via a GTP tunnel. For example, eNB 103 may use the CN Tunnel ID and/or the TEID associated with UPF 305 to communicate with UPF 305. Further, eNB 103 may provide information to LTE UE 107 regarding the established communications, including the IP address assigned to LTE UE 107.

The established communications (e.g., GTP tunnel carrying a PDU Session, EPS Bearer, etc.) between eNB 103 and UPF 305 may enable LTE UE 107 to communicate user plane traffic with UPF 305. For example, LTE UE 107 may output (e.g., in the "uplink" direction) user plane traffic, such as voice traffic, data traffic, or the like. eNB 103 may proceed to forward (at 322) the traffic to UPF 305 via the established communications between eNB 103 and UPF 305. For example, eNB 103 may use the TEID, EPS Bearer ID, IP address, etc. when forwarding the user plane traffic. One or more routing components that are communicatively coupled to eNB 103 (e.g., a Serving Gateway ("SGW")) may forward the user plane traffic to UPF 305 using the TED, EPS Bearer ID, IP address, etc. UPF 305 may forward the traffic to its destination via an external Data Network ("DN"), such as the Internet.

In this manner, while LTE UE 107 maintains an RF connection with eNB 103 of an LTE RAN, the traffic may be handled by 5G core network 109 instead of by LTE core network 101. Handling the traffic by 5G core network 109 may aid in the transition of the utilization of 5G technologies as they become more prevalent. Additionally, 5G core network 109 may be capable of providing additional or enhanced services, as compared to LTE core network 101. Further, leveraging the continued use of currently deployed LTE architecture (e.g., existing LTE RANs) in conjunction with elements of a 5G core network may facilitate the more rapid deployment of 5G technologies without requiring the decommissioning, removal, or non-utilization of existing LTE architecture.

Figure 4:
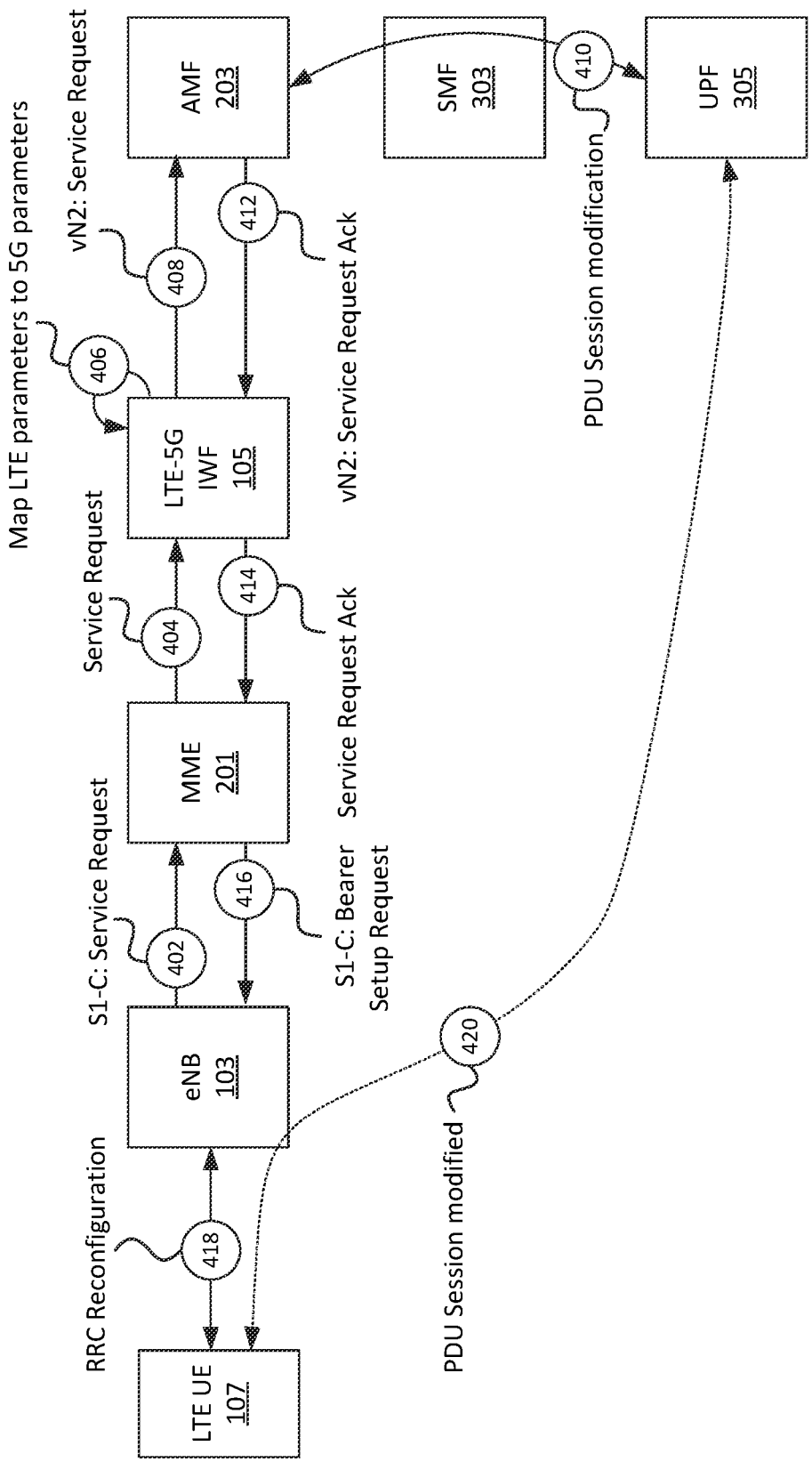
FIG. 4 illustrates example signaling, involving a LTE-5G IWF, to modify an existing communications session between a LTE UE and a 5G core network, in accordance with some embodiments.

FIG. 4 illustrates example signaling to modify an existing communications session between LTE UE 107 and a 5G core network 109, in accordance with some embodiments. The signaling shown in this figure may be used to modify an existing communications session (e.g., PDU Session) and/or to establish a new PDU Session between LTE UE 107 and 5G core network 109. In some embodiments, the signaling shown in FIG. 4 may occur in conjunction with, or after, the signaling shown in FIG. 3. For instance, the signaling shown in FIG. 4 may be used to change QoS parameters associated with an existing PDU Session, and/or to establish additional PDU Sessions according to particular QoS parameters.

As shown, for example, eNB 103 may output (at 402) a Service Request message to MME 201. This message may be outputted via an S1 interface (e.g., an S1-C interface). eNB 103 may output the Service Request message based on uplink traffic received from LTE UE 107. The uplink traffic may include user plane traffic, such as voice call traffic (e.g., Voice over LTE ("VoLTE") traffic), data traffic, and/or other user plane traffic. The Service Request message may include a PDU Session ID and/or one or more other identifiers (e.g., as indicated in the Attach Accept message received at 320, shown in FIG. 3) of the PDU Session, GTP tunnel, and/or other established communication between eNB 103 and UPF 305.

MME 201 may forward and/or otherwise output (at 404) the Service Request message to LTE-5G IWF 105. As similarly described above, in some embodiments, eNB 103 may "directly" provide the Service Request message to LTE-5G IWF 105 (e.g., without providing the message to MME 201). LTE-5G IWF 105 may identify, based on the Service Request message, stored context information for UE 107 (e.g., context information in accordance with the above description of FIG. 3). For example, LTE-5G IWF 105 may identify one or more TFTs associated with the Service Request and/or UE 107, a QCI associated with the Service Request and/or with UE 107, one or more APNs associated with UE 107 and/or the Service Request, and/or other context information associated with UE 107. While not explicitly shown here, MME 201 and/or LTE-5G IWF 105 may perform a verification and/or authentication process (e.g., by communicating with an Home Subscriber Server ("HSS") and/or one or more other elements of LTE core network 101) to verify that UE 107 is authorized to access the requested service, and/or is authorized to access the requested service with a given QoS level (e.g., QCI).

LTE-5G IWF 105 may map (at 406) a first set of parameters, associated with the Service Request, to a second set of parameters. Generally speaking, the first set of parameters may be parameters utilized by elements of LTE core network 101 (and may be referred to as "LTE parameters"), while the second set of parameters may be parameters utilized by elements of 5G core network 109 (and may be referred to as "5G parameters"). For example, LTE-5G IWF 105 may identify a QFI, Service Data Flow ("SDF"), and/or other QoS-related 5G parameters that correspond to a QCI, TFT, and/or other QoS-related LTE parameters indicated by the Service Request. For example, LTE-5G IWF 105 may receive and/or maintain mapping information that may be used to determine the appropriate 5G parameters that correspond to the LTE parameters.

LTE-5G IWF 105 may output (at 408) a Service Request message to AMF 203. This Service Request message may be provided in an N2 container, via an N26 interface between LTE-5G IWF 105 and AMF 203. Thus, this Service Request message may be considered as being provided between the vN2 interface between LTE-5G IWF 105 and AMF 203, as similarly discussed above. By virtue of being provided via the vN2 interface, from the standpoint of AMF 203, AMF 203 may determine that the Service Request message was received from vgNB 113.

While described herein in the context of a PDU Session modification performed based on a Service Request message (e.g., as received from eNB 103 and/or from LTE UE 107), in practice, the PDU Session modification may be triggered by a message or notification from another device or system (e.g., in lieu of eNB 103 or LTE UE 107). For example, AMF 203 may initiate the PDU Session modification (e.g., based on information received from Unified Data Management function ("UDM") of 5G core network 109), and/or some other device or system may initiate the PDU Session modification (e.g., Policy Control Function ("PCF") of 5G core network 109, an Application Function ("AF") of 5G core network 109, and/or some other device or system).

AMF 203 may utilize the PDU Session ID, included in the Service Request message, to identify UPF 305 and to perform (at 410) a PDU Session modification procedure. While the PDU Session modification procedure is shown in the figure as a single line, in practice, this procedure may include multiple signals or messages communicated between AMF 203, SMF 303, UPF 305, and/or one or more other elements of 5G core network 109. For the sake of brevity, these multiple signals or messages are not reproduced or discussed here. The PDU Session modification procedure may include indicating, to UPF 305, the 5G QoS-related parameters (e.g., as determined by LTE-5G IWF 105 at 406) indicated in the Service Request message.

The PDU Session modification procedure may include modifying an existing PDU Session (e.g., as established at 312 in FIG. 3) in accordance with the 5G QoS-related parameters. For example, UPF 305 and/or AMF 203 may maintain information associating the PDU Session with the 5G QoS-related parameters, such that UPF 305 and/or one or more other elements of 5G core network 109 may process the traffic in accordance with these parameters. For example, the QoS-related parameters may be used to queue, process, prioritize, etc. traffic in a differentiated manner compared to traffic associated with different QoS-related parameters. In some embodiments, in addition to, or in lieu of, the modification (at 410) of an existing PDU Session, AMF 203 and UPF 305 may establish a new PDU Session based on the 5G QoS-related parameters. The establishment of a new PDU Session, in such situations, may thus also be represented by dashed arrow 410 in FIG. 4.

Once the PDU Session has been modified or created (at 410), AMF 203 may output (at 412) a Service Request Acknowledgement ("Ack") message to LTE-5G IWF 105. This message may be provided, for example, via the vN2 interface between AMF 203 and LTE-5G IWF 105. Thus, from the standpoint of AMF 203, AMF 203 may provide the Service Request Ack message to vgNB 113. The Service Request Ack message may indicate that the PDU Session has been modified in accordance with the Service Request message (provided at 408). Among other information, the Service Request Ack message may include the PDU Session ID of the PDU Session that was modified. The Service Request Ack message may indicate the 5G QoS-related parameters based on which the PDU Session was modified. LTE-5G IWF 105 may verify that these parameters match the parameters that were mapped (at 406) by LTE-5G IWF 105 to LTE QoS-related parameters. In the event that the PDU Session modification was initiated by an element of 5G core network 109, LTE-5G IWF 105 may use the QoS information in the Service Request Ack message to generate a mapped set of LTE QoS-related parameters that correspond to the 5G QoS-related parameters indicated in the Service Request Ack message.

LTE-5G IWF 105 may output (at 414) an indication to MME 201 that the Service Request Ack message was received (at 412) from AMF 203. The Service Request Ack message (output at 414) may include some or all of the information included in the Service Request Ack message (output at 412), such as the PDU Session ID of the PDU Session that was modified. Based on receiving the indication that the PDU Session has been modified (e.g., in accordance with the Service Request message received at 402), MME 201 may output (at 416) a Bearer Setup Request to eNB 103 via an S1-C interface. The Bearer Setup Request may include QoS-related parameters, which may be used by eNB 103 to process, prioritize, etc. traffic associated with the PDU Session. For example, the Bearer Setup Request may include or indicate a TFT, a QCI, etc.

Further, as shown, eNB 103 and LTE UE 107 may perform (at 418) an RRC reconfiguration procedure based on the received QoS-related parameters. For example, via one or more RRC messages, eNB 103 may indicate the QoS-related parameters (e.g., TFT, QCI, etc.) to LTE UE 107, which may utilize such parameters when communicating (at 420) with UPF 305.

Based on the above example process, UE 107, eNB 103, and UPF 305 may process user plane traffic according to corresponding QoS parameters. For example, as noted above, LTE UE 107 and eNB 103 may process the traffic according to a set of LTE QoS-related parameters (e.g., as indicated in or determined based on the Service Request message output at 402), while UPF 305 may process the traffic according to a corresponding set of 5G QoS-related parameters. For example, as discussed above, the corresponding set of 5G QoS-related parameters may have been determined or mapped (at 406) by LTE-5G IWF 105, based on the set of LTE QoS-related parameters. By virtue of processing the traffic according to the same (or corresponding) QoS parameters across both LTE and 5G networks (e.g., an LTE RAN as implemented by eNB 103 and elements of 5G core network 109, such as UPF 305), embodiments described herein may allow for the interworking between these two types of networks in a manner that does not alter or modify QoS parameters. Accordingly, QoS parameters, which may be associated with particular subscriber types, traffic types, UE device types, etc. may be maintained in situations where 5G core network 109 is used to handle user plane traffic that is carried over an LTE RAN, thus preserving or enhancing the user experience of users associated with such traffic.

Figure 5:
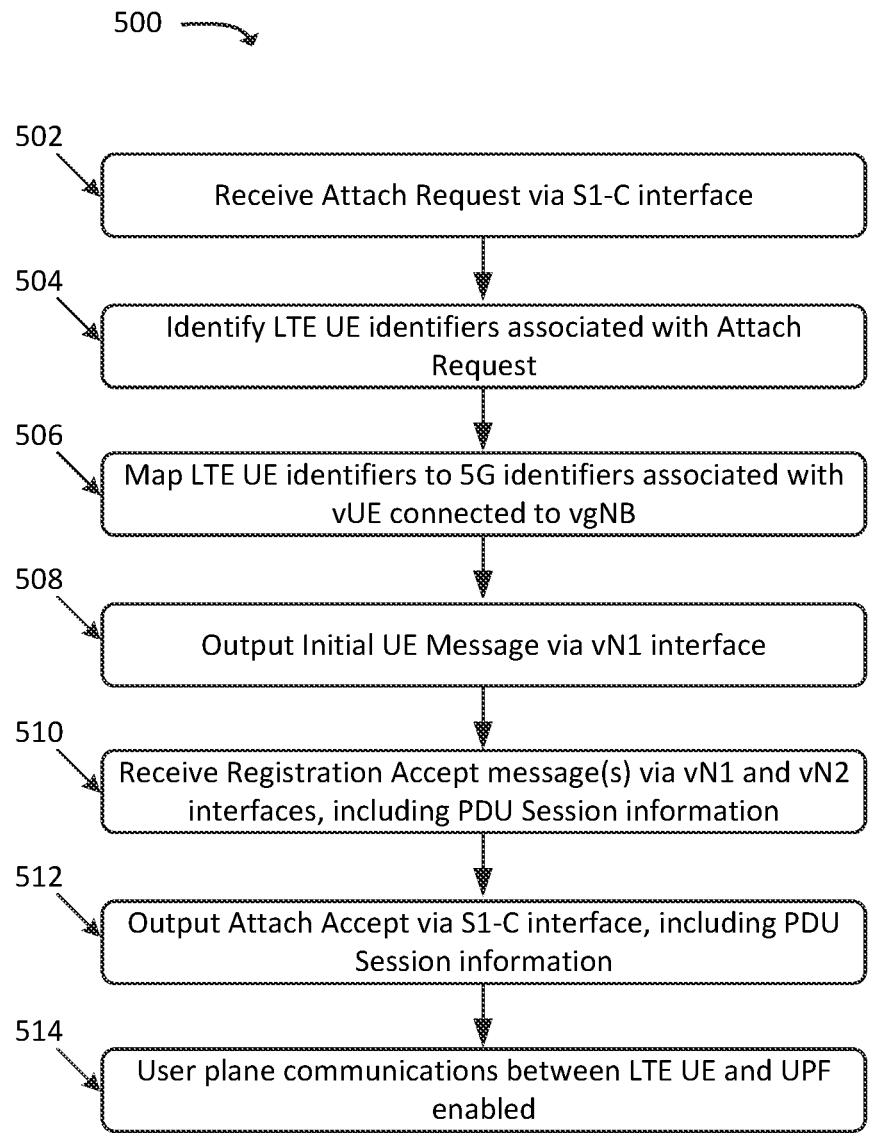
FIG. 5 illustrates an example process for establishing communications between a LTE UE and a 5G core network, in accordance with some embodiments.

FIG. 5 illustrates an example process 500 for establishing user plane communications between LTE UE 107 and 5G core network 109, in accordance with some embodiments. In some embodiments, some or all of process 500 may be performed by LTE-5G IWF 105. In some embodiments, one or more other devices may perform some or all of process 500 (e.g., in concert with, and/or in lieu of, LTE-5G IWF 105).

As shown, process 500 may include receiving (at 502) an Attach Request via an S1-C interface. For example, the Attach Request may have been received from eNB 103, to which a particular LTE UE 107 is connected. As mentioned above, the Attach Request may be received "directly" by LTE-5G IWF 105 from eNB 103, and/or may be received "indirectly." For example, MME 201 may have received the Attach Request via an S1-C interface between MME 201 and eNB 103, and may forward some or all of the Attach Request to LTE-5G IWF 105.

Process 500 may further include identifying (at 504) one or more LTE UE identifiers associated with the Attach Request. For example, the Attach Request may include one or more identifiers of LTE UE 107. The identifiers may be LTE identifiers, in that these identifiers may be used by elements of LTE networks to identify LTE UE 107. Such identifiers may include, for instance, IMSI, IMEI, GUTI, and/or other identifiers of LTE UE 107.

Process 500 may additionally include mapping (at 506) the LTE UE identifiers to one or more 5G UE identifiers. For example, LTE-5G IWF 105 may logically associate LTE UE 107 with 5G vUE 111 by mapping a set of LTE UE identifiers (e.g., IMSI, IMEI, GUTI, etc.), associated with LTE UE 107, to a set of 5G UE identifiers (e.g., SUCI, SUPI, PEI, etc.) associated with 5G vUE 111. As mentioned above, the 5G UE identifiers may be generated based on the LTE UE identifiers, and/or the 5G UE identifiers may be generated or selected in a manner that is independent of the LTE UE identifiers. In some embodiments, when mapping LTE UE 107 to 5G vUE 111, LTE-5G IWF 105 may also generate a logical association between LTE UE 107 and vgNB 113. More specifically, LTE-5G IWF 105 may generate or maintain identifying information for vgNB 113, as well as a logical indication that 5G vUE 111 is communicatively coupled to vgNB 113.

Process 500 may also include outputting (at 508) an Initial UE Message via a vN1 interface. For example, as described above, the Initial UE Message may be provided via an N26 interface (e.g., between LTE-5G IWF 105 and AMF 203, and/or between MME 201 and AMF 203) in an N1 container. The Initial UE Message may include the mapped 5G UE identifiers (mapped at 506). Thus, by virtue of being received via an N1 container, AMF 203 may interpret this message as having been received from 5G vUE 111, with which the 5G UE identifiers are associated.

Process 500 may further include receiving (at 510) one or more Registration Accept messages (e.g., via vN1 and vN2 interfaces), including PDU Session information. For example, LTE-5G IWF 105 may receive, via the N26 interface and in N1 and/or N2 containers, one or more Registration Accept messages from AMF 203. The Registration Accept messages may include information identifying one or more PDU Sessions that have been created based on the Initial UE Message. For example, as discussed above with respect to FIG. 3, AMF 203, SMF 303, and/or UPF 305 may participate in a PDU Session creation procedure, in which a PDU Session is created at UPF 305. In some embodiments, the Registration Accept messages may include QoS-related information for the PDU Session, which may include QFI, SDF, and/or other QoS-related 5G parameters.

As part of the PDU Session creation process, an IP address may be created for 5G vUE 111 (e.g., by SMF 303 and/or by UPF 305). The IP address may include an IPv4 address or an IPv6 prefix. Further, a CN Tunnel ID may be generated (e.g., by SMF 303 and/or by UPF 305) to represent a GTP tunnel, for which UPF 305 is one endpoint. As referred to above, the other endpoint for the GTP tunnel may ultimately be LTE UE 107, such that LTE UE 107 and UPF 305 may communicate over the GTP tunnel. From the standpoint of UPF 305, the GTP tunnel may be used to carry a PDU Session. From the standpoint of LTE UE 107 and eNB 103, as discussed herein, the GTP tunnel may be used to carry an EPS bearer.

Process 500 may additionally include outputting (at 512) an Attach Accept message via an S1-C interface. The Attach Accept message may include information associated with the PDU Session, such as a PDU Session Identifier ("ID"). The Attach Accept message may include tunnel information for a GTP tunnel that carries the PDU Session, such as a CN Tunnel ID. In some embodiments, the Attach Accept message may include QoS-related information, which may be determined by LTE-5G IWF 105 based on QoS-related information included in the Registration Accept message(s) (received at 510). In some embodiments, LTE-5G IWF 105 may perform a mapping operation to identify QoS-related LTE parameters that are associated with QoS-related 5G parameters included in the Registration Accept message(s), and may include these in the Attach Accept message. Further, LTE-5G IWF 105 may map the CN Tunnel ID to a TEID, and/or may map the PDU Session ID to an EPS Bearer ID, and may include the TEID and PDU Session ID in the Attach Accept message. LTE-5G IWF 105 may provide the Attach Accept message to eNB 103, and/or may instruct MME 201 to provide the Attach Accept message to eNB 103 via an S1-C interface.

Based on receiving the Attach Accept message, eNB 103 may correlate LTE UE 107 to the established PDU Session and/or GTP Tunnel, and user plane communications between LTE UE 107 and UPF 305 may thus be established (at 514). For example, eNB 103 may maintain information correlating the IP address of LTE UE 107 (at included in the Attach Accept message) to the TEID and/or to the EPS Bearer ID. Thus, when receiving uplink traffic from LTE UE 107, eNB 103 may forward the uplink traffic, via the GTP Tunnel, to UPF 305. Further, when receiving downlink traffic from UPF 305 via the GTP Tunnel, eNB 103 may identify the IMSI, IMEI, etc. of LTE UE 107 based on the IP address indicated in the downlink traffic, and may provide the downlink traffic to LTE UE 107. Further, in situations where the Attach Accept message includes QoS-related parameters (e.g., QCI, one or more TFTs, etc.), eNB 103 and/or LTE UE 107 may utilize this information to implement the appropriate QoS treatment of traffic transmitted through the established user plane communications. In situations where the Attach Accept message does not include QoS-related parameters, eNB 103 and/or LTE UE 107 may treat the established communications as a "Default" EPS Bearer.

Figure 6:
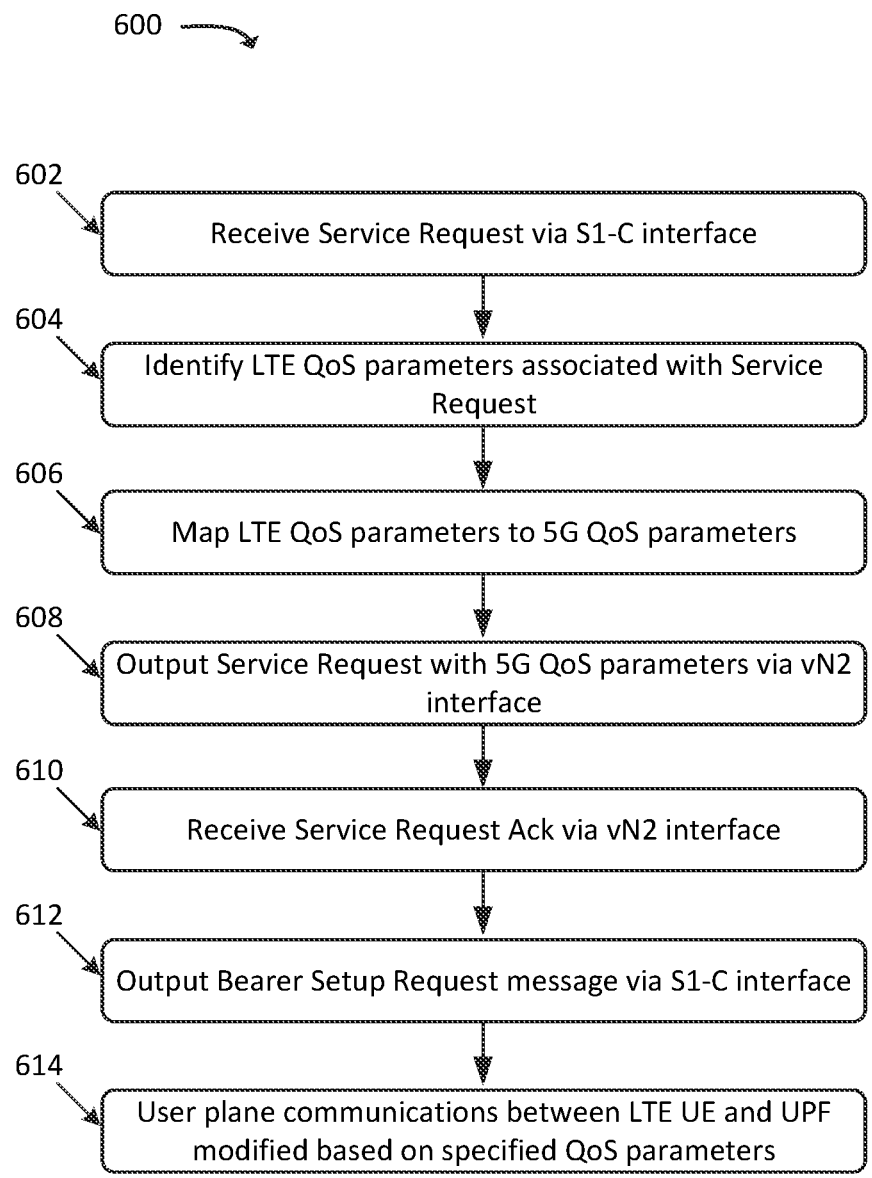
FIG. 6 illustrates an example process for a UE-initiated session modification, in accordance with some embodiments.

FIG. 6 illustrates an example process 600 for a UE-initiated session modification. In some embodiments, some or all of process 600 may be performed by LTE-5G IWF 105. In some embodiments, one or more other devices may perform some or all of process 600 (e.g., in concert with, and/or in lieu of, LTE-5G IWF 105).

As shown, process 600 may include receiving (at 602) a Service Request message via an S1-C interface. For example, LTE-5G IWF 105 may receive the Service Request message from eNB 103 and/or from MME 201, which may have received the Service Request message from LTE-5G IWF 105. The Service Request message may generally be related to a request for a particular type of service or application, such as a voice call service, a data service, etc. The requested type of service may be associated with, and/or the Service Request message may specify, one or more QoS-related LTE parameters, such as a QCI. The Service Request may also include an EPS Bearer ID and/or TEID, to indicate the communications that are to be modified. The request may, in some embodiments, have originated from LTE UE 107.

Process 600 may further include identifying (at 604) a set of QoS-related LTE parameters associated with the Service Request message. For example, as mentioned above, the Service Request message may indicate a QCI and/or other parameter related to QoS. Additionally, or alternatively, LTE-5G IWF 105 may determine QCI (or other QoS-related parameter) based on information specified in the Service Request message. For example, the Service Request message may specify a type of service. LTE-5G IWF 105 may identify a QCI associated with the specified type of service based on communicating with an HSS and/or some other device or system that indicates QoS parameters associated with types of services. Additionally, or alternatively, different UEs may be associated with different QoS levels for the same type of traffic. In such situations, LTE-5G IWF 105 may determine the QCI based on an identifier associated with LTE UE 107, and/or based on the type of requested service.

Process 600 may additionally include mapping (at 606) the set of QoS-related LTE parameters to a set of QoS-related 5G parameters. For example, LTE-5G IWF 105 may maintain mapping information that relates QoS-related LTE parameters (e.g., QCI, TFTs, etc.) to a set of QoS-related 5G parameters (e.g., QFI, SDFs, etc.). In some embodiments, LTE-5G IWF 105 may utilize machine learning and/or other suitable techniques to generate or refine this mapping information. For example, over time, LTE-5G IWF 105 and/or some other device or system may monitor the performance of traffic based on these mappings and may refine or modify the mappings, such that traffic that is associated with mapped QoS-related parameters performs in a manner consistent with its original QoS-related parameters.

LTE-5G IWF 105 may also map other LTE parameters to 5G parameters. For example, LTE-5G IWF 105 may identify a PDU Session ID and/or CN Tunnel ID that are associated with the EPS Bearer ID and/or TEID indicated in the Service Request (received at 602). For example, as described above, the LTE parameters (e.g., EPS Bearer ID and TEID) may have previously been associated with the 5G parameters (e.g., PDU Session ID and CN Tunnel ID) as part of a previous PDU Session establishment process.

Process 600 may also include outputting (at 608) a Service Request message, including the mapped set 5G parameters, via a vN2 interface. For example, LTE-5G IWF 105 may output a Service Request message to AMF 203 in an N2 container via an N26 interface. The Service Request message may include an identifier of vgNB 113 (e.g., which may have been previously associated with 5G vUE 111 as part of a process in which LTE UE 107 was mapped to 5G vUE 111). Thus, from the standpoint of AMF 203, AMF 203 may receive the Service Request message from vgNB 113, via which 5G vUE 111 is connected. The Service Request message may also indicate the PDU Session ID and CN Tunnel ID for the session to be modified, as well as the QoS-related parameters based on which the session is to be modified.

Once AMF 203 receives the Service Request message (via the vN2 interface), AMF 203 may communicate with SMF 303 and/or UPF 305 to modify the PDU Session indicated in the Service Request message. For example, UPF 305 may store or maintain the QoS-related parameters, such that UPF 305 handles, processes, etc. traffic associated with the PDU Session in accordance with the QoS-related parameters.

Process 600 may also include receiving (at 610) a Service Request Ack via the vN2 interface. For example, once the PDU Session modification is complete, AMF 203 may output the Service Request Act message to LTE-5G IWF 105 via the vN2 interface. Specifically, for example, from the standpoint of AMF 203, AMF 203 may notify vgNB 113 that the PDU Session modification is complete. By virtue of receiving the message intended for vgNB 113, LTE-5G IWF 105 may determine that the PDU Session modification (requested in the Service Request at 608) has been completed.

Process 600 may further include outputting (at 612) a Bearer Setup Request message via an S1-C interface. For example, LTE-5G IWF 105 may output the Bearer Setup Request to eNB 103 via the S1-C interface, and/or may instruct MME 201 to output the Bearer Setup Request to eNB 103 via the S1-C interface. The Bearer Setup Request message may indicate that the QoS parameters have been configured on the network side (e.g., at UPF 305), and that the QoS parameters should be configured on the UE side (e.g., at LTE UE 107 and/or at eNB 103). The Bearer Setup Request message may include the QoS-related LTE parameters, as well as the TEID and/or EPS Bearer ID associated with the communications between LTE UE 107 and UPF 305.

eNB 103 may maintain configuration information associated with the QoS-related parameters, and may handle, process, etc. (at 614) traffic associated with this communications session (e.g., received via the GTP Tunnel between LTE UE 107 and UPF 305) according to these QoS-related parameters. Further, eNB 103 may notify LTE UE 107 of the QoS-related parameters associated with this traffic via an RRC Reconfiguration procedure, based on which LTE UE 107 may utilize these parameters when handling this traffic.

Figure 7:
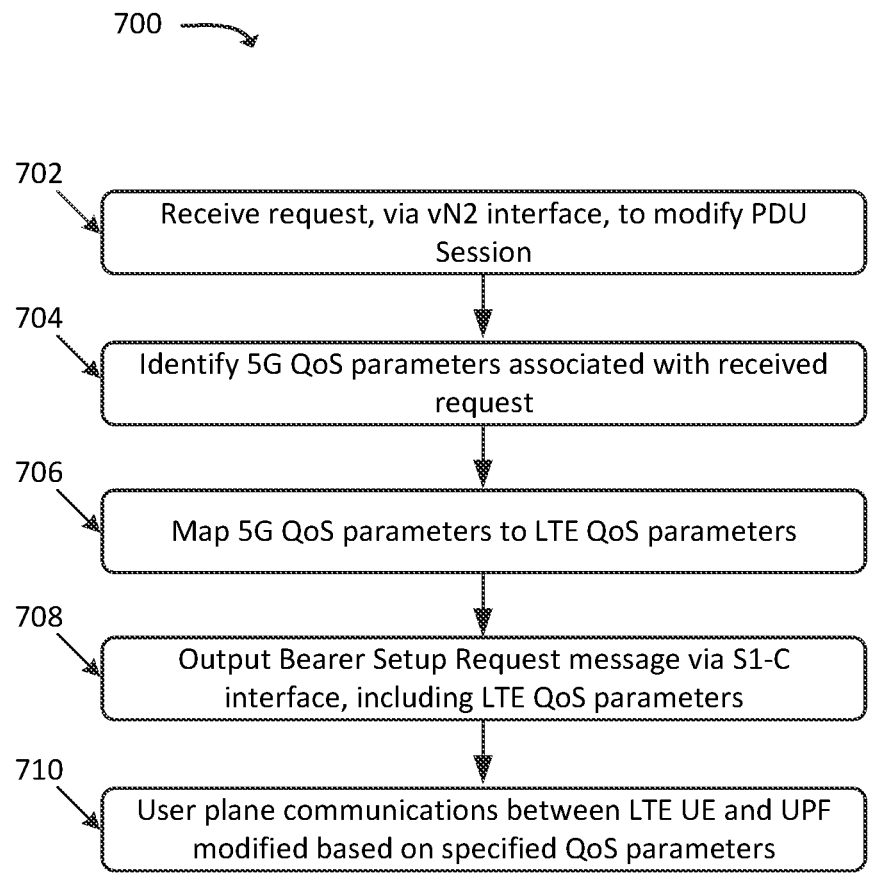
FIG. 7 illustrates an example process for a network-initiated session modification, in accordance with some embodiments.

FIG. 7 illustrates an example process 700 for a network-initiated session modification. In some embodiments, some or all of process 700 may be performed by LTE-5G IWF 105. In some embodiments, one or more other devices may perform some or all of process 700 (e.g., in concert with, and/or in lieu of, LTE-5G IWF 105).

As shown, process 700 may include receiving (at 702) a request, via a vN2 interface, to modify a PDU Session. For example, the request may be received from AMF 203, which may indicate that vgNB 113 is an intended recipient of the request. As similarly described above, LTE-5G IWF 105 may determine that the request is ultimately associated with LTE UE 107 based on a previous mapping that may have been performed between LTE UE 107 and "virtual" devices 5G vUE 111 and vgNB 113. The request may have been provided by AMF 203 based on a PDU Session modification procedure that was performed for a PDU session associated with UPF 305 and LTE UE 107 (or, from the standpoint of AMF 203, between UPF 305 and 5G vUE 111). For example, AMF 203, SMF 303, UPF 305, and/or some other device or system (e.g., an element of 5G core network 109) may have initiated the PDU Session modification procedure. The request may include a PDU Session ID, a CN Tunnel ID, one or more identifiers of 111 (e.g., SUPI, SUCI, PEI, etc.), and/or a set of QoS-related 5G parameters that were used to modify the PDU Session.

Process 700 may further include identifying (at 704) QoS-related 5G params associated with the received request. For example, LTE-5G IWF 105 may identify the QoS-related 5G parameters indicated in the request (received at 702), such as a QFI, one or more SDFs, etc.

Process 700 may additionally include mapping (at 706) the QoS-related 5G parameters to a set of QoS-related LTE parameters. For example, LTE-5G IWF 105 may identify a QCI, one or more TFTs, etc., based on the identified QoS-related 5G parameters. As similarly discussed above, LTE-5G IWF 105 may also identify one or more LTE identifiers for the communications session between LTE UE 107 and UPF 305, such as a TEID and/or an EPS Bearer ID, that are mapped to the 5G identifiers (e.g., the CN Tunnel ID and/or the PDU Session ID).

Process 700 may also include outputting (at 708) a Bearer Setup Request message via an S1-C interface. For example, LTE-5G IWF 105 may output the Bearer Setup Request message to eNB 103, and/or may instruct MME 201 to output the Bearer Setup Request message to eNB 103. As similarly discussed above, this message may cause eNB 103 and/or LTE UE 107 to handle traffic, associated with this communications session, according to the indicated QoS parameters. Thus, user plane communications between LTE UE 107 and UPF 305 may ultimately be modified (at 710) based on the QoS parameters indicated in the request (received at 702) to modify the communications session.

Figure 8:
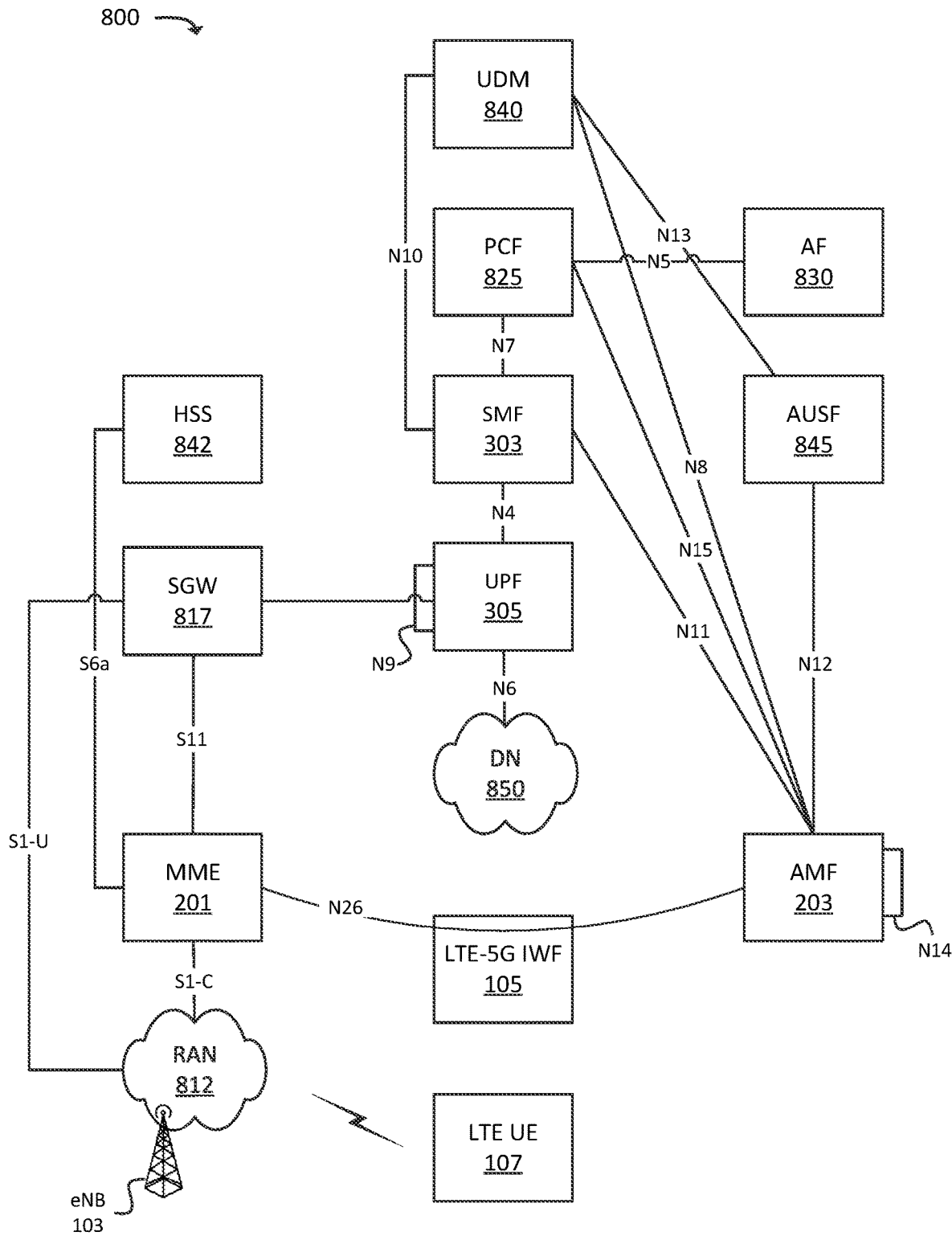
FIG. 8 illustrates an example environment in which one or more embodiments, described herein, may be implemented.

FIG. 8 illustrates an example environment 800, in which one or more embodiments may be implemented. In some embodiments, environment 800 may include elements of a 5G core network. In some embodiments, environment 800 may correspond to a 5G Non-Standalone ("NSA") architecture, in which a LTE RAT may be used in conjunction with a 5G core network. While not explicitly shown here, similar concepts may apply in environments that include an LTE core network and/or a 5G RAN that implements one or more 5G RATs.

As shown, environment 800 may include LTE UE 107, LTE RAN 812 (which may include one or more one or more eNBs 103), MME 201, AMF 203, SMF 303, Policy Control Function ("PCF") 825, Application Function ("AF") 830, UPF 305, UDM 840, HSS 842, Authentication Server Function ("AUSF") 845, and Data Network ("DN") 850.

Portions of environment 800 may correspond to a LTE EPS network, such as LTE RAN 812, eNB 103, MME 201, SGW 817, and HSS 842. Portions of environment 800 may correspond to a 5G core network, such as AMF 203, SMF 303, UPF 305, PCF 825, AF 830, UDM 840, and AUSF 845. While not explicitly shown in FIG. 8, environment 800 may include additional, fewer, different, or differently arranged elements the LTE EPS and/or of the 5G core network. Further, in some embodiments, environment 800 may include a 5G RAN (e.g., as implemented by one or more gNBs) and/or a RAN that implements another type of RAT (e.g., a Third Generation ("3G") RAT, and/or some other RAT). For the sake of brevity, only some portions of the LTE EPS network and the 5G core network are described here.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

LTE UE 107 may include a computation and communication device, such as a wireless mobile communication device that is capable of communicating with LTE RAN 812 and/or DN 850. LTE UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. As provided for herein, LTE UE 107 may send traffic to and/or receive traffic (e.g., user plane traffic) from DN 850 via RAN 812 and UPF 305.

While described herein in the context of LTE UE 107 being an "LTE UE," in practice, LTE UE 107 may be a "dual mode" or "multi mode" UE that is capable of communicating via a 5G RAT and/or some other type of RAT. For example, if LTE UE 107 is capable of communicating via an LTE RAT and a 5G RAT, LTE UE 107 may communicate using a 5G RAT when in communication range of a 5G RAN (e.g., as implemented by a gNB), and may communicate using an LTE RAT when in communication range of a LTE RAN.

LTE RAN 812 may be, or may include, an LTE RAN that includes one or more base stations (e.g., one or more eNBs 103), via which LTE UE 107 may communicate with one or more other elements of environment 800. LTE UE 107 may communicate with LTE RAN 812 via an air interface (e.g., as provided by eNB 103). For instance, RAN 810 may receive traffic (e.g., voice call traffic, data traffic, messaging traffic, signaling traffic, etc.) from LTE UE 107 via the air interface, and may communicate the traffic to UPF 305, and/or one or more other devices or networks. Similarly, RAN 810 may receive traffic intended for LTE UE 107 (e.g., from UPF 305, SGW 817, and/or one or more other devices or networks) and may communicate the traffic to LTE UE 107 via the air interface.

AMF 203 may include one or more devices, systems, Virtualized Network Functions ("VNFs"), etc., that perform operations to register LTE UE 107 with the 5G network, to establish bearer channels associated with a PDU session with LTE UE 107, to hand off LTE UE 107 from the 5G network to another network, to hand off LTE UE 107 from the other network to the 5G network, and/or to perform other operations. In some embodiments, the 5G network may include multiple AMFs 203, which communicate with each other via the N14 interface (denoted in FIG. 8 by the line marked "N14" originating and terminating at AMF 203).

MME 201 may include one or more devices, systems, VNFs, etc., that perform operations to register LTE UE 107, to facilitate the establishment of bearer channels associated with LTE UE 107, to facilitate handovers of LTE UE 107, and/or to perform other operations. MME 201 may communicate with AMF 203 via an N26 interface. MME 201 may, in some embodiments, be implemented by the same device or system that implements LTE-5G IWF 105, and/or may be communicatively coupled with LTE-5G IWF 105. For example, MME 201 may communicate with LTE-5G IWF 105 via an N26 interface, and/or may instruct LTE-5G IWF 105 to communicate with AMF 203 via an N26 interface.

LTE-5G IWF 105 may include one or more devices, systems, VNFs, etc., that perform operations described herein. Generally speaking, for example, LTE-5G IWF 105 facilitate the establishment or modification of user plane communications between LTE UE 107 and UPF 305, by communicating with elements of the LTE EPS network (e.g., MME 201) and elements of the 5G core network (e.g., AMF 203). LTE-5G IWF 105 may, for example, map 5G parameters or messages to LTE parameters or messages to facilitate the establishment or modification of such communications.

SGW 817 may include one or more devices, systems, VNFs, etc., that aggregate traffic received from one or more eNBs 103 and send the aggregated traffic to an external network or device via UPF 305. Additionally, SGW 817 may aggregate traffic received from one or more UPFs 305 and may send the aggregated traffic to one or more eNBs 103. SGW 817 may operate as an anchor for the user plane during inter-eNB handovers and as an anchor for mobility between different telecommunication networks or LTE RANs 812.

SMF 303 may include one or more devices, systems, VNFs, etc., that gather, process, store, and/or provide information in a manner described herein. SMF 303 may, for example, facilitate in the establishment of communication sessions on behalf of LTE UE 107. In some embodiments, the establishment of communications sessions may be performed in accordance with one or more policies provided by PCF 825.

PCF 825 may include one or more devices, systems, VNFs, etc., that aggregate information to and from the 5G network and/or other sources. PCF 825 may receive information regarding policies and/or subscriptions from one or more sources, such as subscriber databases and/or from one or more users (such as, for example, an administrator associated with PCF 825).

AF 830 may include one or more devices, systems, VNFs, etc., that receive, store, and/or provide information that may be used in determining parameters (e.g., quality of service parameters, charging parameters, or the like) for certain applications.

UPF 305 may include one or more devices, systems, VNFs, etc., that receive, store, and/or provide data (e.g., user plane data). For example, UPF 305 may receive user plane data (e.g., voice call traffic, data traffic, etc.), destined for LTE UE 107, from DN 850, and may forward the user plane data toward LTE UE 107 (e.g., via LTE RAN 812, SGW 817, and/or one or more other devices). In some embodiments, multiple UPFs 305 may be deployed (e.g., in different geographical locations and/or for different traffic or service types), and the delivery of content to LTE UE 107 may be coordinated via the N9 interface (e.g., as denoted in FIG. 8 by the line marked "N9" originating and terminating at UPF 305). Similarly, UPF 305 may receive traffic from LTE UE 107 (e.g., via RAN 812, SGW 817, and/or one or more other devices), and may forward the traffic toward DN 850. In some embodiments, UPF 305 may communicate (e.g., via the N4 interface) with SMF 303, regarding user plane data processed by UPF 305.

UDM 840, HSS 842, and AUSF 845 may include one or more devices, systems, VNFs, etc., that manage, update, and/or store profile information associated with one or more subscribers. UDM 840, HSS 842, and/or AUSF 845 may perform authentication, authorization, and/or accounting operations associated with the subscriber and/or a communication session with LTE UE 107. One or more of these devices or systems may maintain information indicating particular QoS levels that are associated with particular subscribers. In some embodiments, the QoS information may also be maintained on a per-traffic type basis, a per-device type basis, and/or some other basis. In this manner, UDM 840, HSS 842, and/or AUSF 845 may be involved in processes where a QoS level for a given UE, subscriber, traffic flow, etc. is to be determined or verified.

DN 850 may include one or more wired and/or wireless networks. For example, DN 850 may include an IP-based PDN, a wide area network ("WAN") such as the Internet, a private enterprise network, and/or one or more other networks. LTE UE 107 may communicate, through DN 850, with data servers, other UEs, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which LTE UE 107 may communicate.

Figure 9:
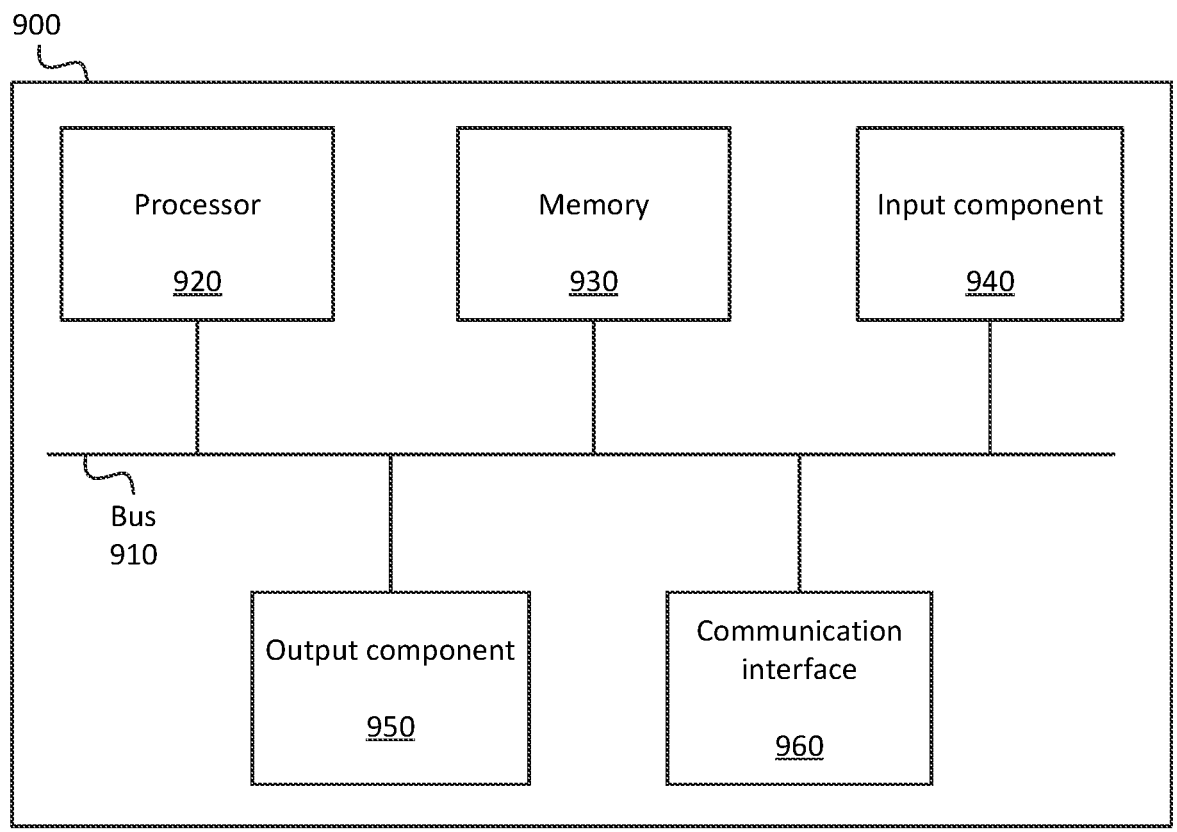
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 3-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
determine a first identifier of a virtual User Equipment ("UE"), the virtual UE representing a UE that is communicatively coupled to a base station of a radio access network ("RAN");
output, to a core network, a first message that includes the first identifier of the virtual UE;
receive, from the core network and in response to the first message, a second message that includes a second identifier; and
output, to the UE and based on receiving the second message, a third message that includes the second identifier, wherein the UE uses the second identifier to establish a communication session, via the RAN, between the UE and the core network.

2. The device of claim 1, wherein the communication session includes a protocol data unit ("PDU") session.

3. The device of claim 2, wherein the second identifier includes at least one of:

a PDU Session Identifier; or a Core Network ("CN") Tunnel Identifier.

4. The device of claim 1, wherein the first identifier of the virtual UE is different from an identifier of the UE.

5. The device of claim 1, wherein the second identifier includes an identifier associated with the communication session, wherein the second message further includes a third identifier associated with the virtual UE, wherein the UE further uses the third identifier in addition to the second identifier to establish the communication session between the UE and the core network.

6. The device of claim 5, wherein the third identifier is used by the core network to associate communications from the UE with the virtual UE.

7. The device of claim 6, wherein the core network further maintains information associating the third identifier with the first identifier of the virtual UE.

8. A non-transitory computer-readable medium, storing a plurality of processor-executable instructions to:

determine a first identifier of a virtual User Equipment ("UE"), the virtual UE representing a UE that is communicatively coupled to a base station of a radio access network ("RAN");

output, to a core network, a first message that includes the first identifier of the virtual UE;

receive, from the core network and in response to the first message, a second message that includes a second identifier; and output, to the UE and based on receiving the second message, a third message that includes the second identifier, wherein the UE uses the second identifier to establish a communication session, via the RAN, between the UE and the core network.

9. The non-transitory computer-readable medium of claim 8, wherein the communication session includes a protocol data unit ("PDU") session.

10. The non-transitory computer-readable medium of claim 9, wherein the second identifier includes at least one of:

a PDU Session Identifier; or a Core Network ("CN") Tunnel Identifier.

11. The non-transitory computer-readable medium of claim 8, wherein the first identifier of the virtual UE is different from an identifier of the UE.

12. The non-transitory computer-readable medium of claim 8, wherein the second identifier includes an identifier associated with the communication session, wherein the second message further includes a third identifier associated with the virtual UE, wherein the UE further uses the third identifier in addition to the second identifier to establish the communication session between the UE and the core network.

13. The non-transitory computer-readable medium of claim 12, wherein the third identifier is used by the core network to associate communications from the UE with the virtual UE.

14. The non-transitory computer-readable medium of claim 13, wherein the core network further maintains information associating the third identifier with the first identifier of the virtual UE.

15. A method, comprising:

determining a first identifier of a virtual User Equipment ("UE"), the virtual UE representing a UE that is communicatively coupled to a base station of a radio access network ("RAN");

outputting, to a core network, a first message that includes the first identifier of the virtual UE;

receiving, from the core network and in response to the first message, a second message that includes a second identifier; and outputting, to the UE and based on receiving the second message, a third message that includes the second identifier, wherein the UE uses the second identifier to establish a communication session, via the RAN, between the UE and the core network.

16. The method of claim 15, wherein the communication session includes a protocol data unit ("PDU") session, wherein the second identifier includes at least one of:

a PDU Session Identifier; or a Core Network ("CN") Tunnel Identifier.

17. The method of claim 15, wherein the first identifier of the virtual UE is different from an identifier of the UE.

18. The method of claim 15, wherein the second identifier includes an identifier associated with the communication session, wherein the second message further includes a third identifier associated with the virtual UE, wherein the UE further uses the third identifier in addition to the second identifier to establish the communication session between the UE and the core network.

19. The method of claim 18, wherein the third identifier is used by the core network to associate communications from the UE with the virtual UE.

20. The method of claim 19, wherein the core network further maintains information associating the third identifier with the first identifier of the virtual UE.

* * * * *